US012659348B2

(12) United States Patent

He et al.

(10) Patent No.: US 12,659,348 B2

(45) Date of Patent: Jun. 16, 2026

(54) PHISHING DETECTION MODEL TRAINING WITH OBFUSCATION TECHNIQUE-CLASSIFIED TRAINING SAMPLES

(71) Applicant: Gen Digital Inc., Tempe, AZ (US)

(72) Inventors: Xinlei He, Saarbrücken (DE); Savino Dambra, Nice (FR); Javier Alejandro Aldana Iuit, Prague (CZ); Kevin Roundy, El Segundo, CA (US)

(73) Assignee: Gen Digital Inc., Tempe, AZ (US)

( * ) Notice: Subject to any disclaimer, the term of this patent is extended or adjusted under 35 U.S.C. 154(b) by 281 days.

(21) Appl. No.: 18/494,414

(22) Filed: Oct. 25, 2023

(65) Prior Publication Data

US 2025/0141921 A1     May 1, 2025

(51) Int. Cl.
*H04L 9/40* (2022.01)
*G06N 20/00* (2019.01)
(52) U.S. Cl.
CPC ......... *H04L 63/1483* (2013.01); *G06N 20/00* (2019.01); *H04L 63/1425* (2013.01)

(58) Field of Classification Search
USPC .......................................................... 726/23
See application file for complete search history.

(56) References Cited

U.S. PATENT DOCUMENTS

| | | | |
|---|---|---|---|
| 9,578,048 B1 * | 2/2017 | Hunt .................. | H04L 63/1416 |
| 2017/0078310 A1 * | 3/2017 | Hunt ...................... | H04L 63/20 |
| 2020/0067976 A1 * | 2/2020 | Jakobsson ........... | H04L 63/1483 |
| 2023/0004561 A1 * | 1/2023 | Holub ............... | G06F 16/24553 |
| 2023/0353595 A1 * | 11/2023 | Hu .......................... | G06N 3/045 |

* cited by examiner

*Primary Examiner* — Atta Khan

(74) *Attorney, Agent, or Firm* — AVEK IP, LLC; Mark C. Young

(57) ABSTRACT

Obfuscation techniques used in phishing attacks that evade detection using current machine learning models can be identified and statistically characterized for use in generating adversarial training samples to improve the performance of a machine learning model phishing classifier. By using statistical information regarding the prevalence and effectiveness of various obfuscation techniques observed in real-world samples, adversarial samples that are effective and realistic examples of phishing content that evades phishing content classifier detection can be generated and used to augment the data set used for training or re-training the machine learning model classifier.

18 Claims, 4 Drawing Sheets

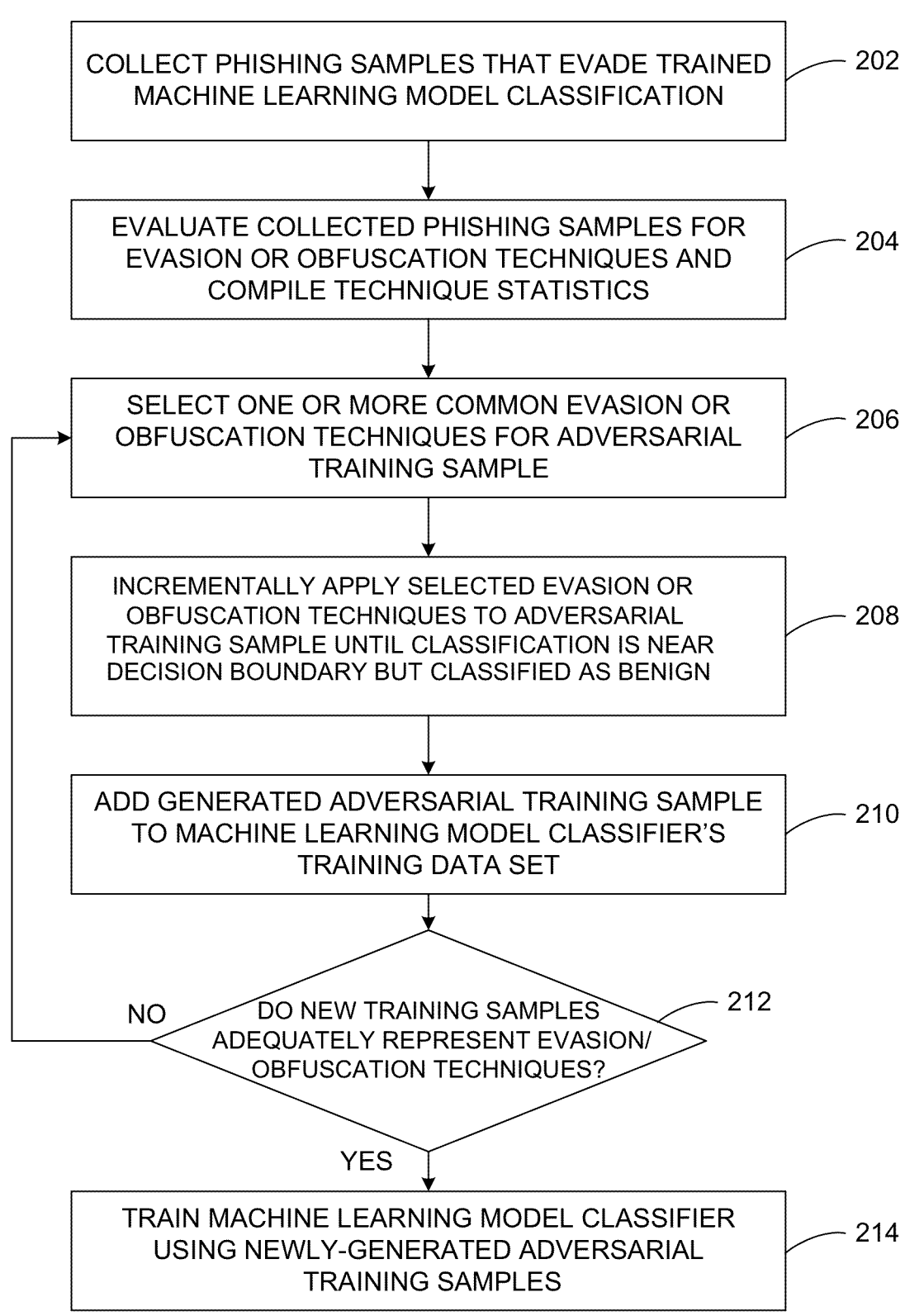

COLLECT PHISHING SAMPLES THAT EVADE TRAINED MACHINE LEARNING MODEL CLASSIFICATION — 202

EVALUATE COLLECTED PHISHING SAMPLES FOR EVASION OR OBFUSCATION TECHNIQUES AND COMPILE TECHNIQUE STATISTICS — 204

SELECT ONE OR MORE COMMON EVASION OR OBFUSCATION TECHNIQUES FOR ADVERSARIAL TRAINING SAMPLE — 206

INCREMENTALLY APPLY SELECTED EVASION OR OBFUSCATION TECHNIQUES TO ADVERSARIAL TRAINING SAMPLE UNTIL CLASSIFICATION IS NEAR DECISION BOUNDARY BUT CLASSIFIED AS BENIGN — 208

ADD GENERATED ADVERSARIAL TRAINING SAMPLE TO MACHINE LEARNING MODEL CLASSIFIER'S TRAINING DATA SET — 210

DO NEW TRAINING SAMPLES ADEQUATELY REPRESENT EVASION/ OBFUSCATION TECHNIQUES? — 212

NO

YES

TRAIN MACHINE LEARNING MODEL CLASSIFIER USING NEWLY-GENERATED ADVERSARIAL TRAINING SAMPLES — 214

FIG. 2

PHISHING DETECTION MODEL TRAINING WITH OBFUSCATION TECHNIQUE-CLASSIFIED TRAINING SAMPLES

FIELD

The present invention relates generally to detecting malicious content in computerized devices, and more specifically to training phishing detection models with training samples generated using classification of observed obfuscation or avoidance techniques.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Security of information, including Personally Identifiable Information (PII) and user credential, profile, or behavioral information, is also a challenge for both individual users and for companies that handle such user information. This information can be used to impersonate a user or steal their identity, to target advertising or other goods and services to a user, or to gather information about a user that they might otherwise wish to remain private. One type of malicious user attack known as "phishing" comprises fraudulently pretending to be a legitimate company for the purpose of obtaining such information from the user, such as login credentials, credit card numbers, or the like. In one such example, malicious emails purporting to be from a reputable company contain links or other content directing users to a website that is a clone of a legitimate site, prompting a user to reset a password, re-enter credit card information, or otherwise reveal personal information. In another example, a legitimate website is hacked or altered to direct users to an illegitimate website to enter personal information.

Although antimalware tools have adapted to detect phishing attempts by examining emails and identifying malicious websites, phishing tools have similarly evolved to evade detection using methods such as presenting a user with images of text rather than text, using domain names that appear to be legitimate, and altering legitimate images such as by blurring, stretching, or cropping them before presenting them in a phishing attack.

Detecting phishing attacks via illegitimate websites, emails, text messages, and other mechanisms therefore remains an ongoing technical challenge, and for reasons such as these a need exists for improved detection of phishing attacks.

SUMMARY

One example embodiment comprises training a machine learning model to classify data as a malicious phishing attack or benign. At least one phishing page that evades malicious identification by a phishing content classifier is identified, and the technique used to evade malicious classification is tagged or labeled. The most common techniques used to evade malicious classification are identified, and at least one adversarial training sample is generated using one or more of the most common techniques used to evade malicious classification. The phishing content classifier is then trained with the adversarial training sample or samples. Using the generated adversarial training samples to augment the training data provides a more robust data set for training the machine learning model which in turn provides more robust detection and classification of malicious or benign content. In further embodiments, the training data is augmented with one or more parts of one or more of the generated adversarial training samples so that the augmented data training set may be trained to recognize and classify variations of the originally identified malicious data. The machine learning model trained with the augmented data set comprising generated adversarial training samples can thus detect malicious data not detectable by conventional training methods.

The details of one or more examples are set forth in the accompanying drawings and the description below. Other features and advantages will be apparent from the description and drawings, and from the claims.

BRIEF DESCRIPTION OF THE FIGURES

FIG. 2 is a flow diagram of a method of using observed phishing obfuscation techniques to generate adversarial training samples to improve machine learning model performance in classifying phishing attacks, consistent with an example embodiment.

DETAILED DESCRIPTION

Figure 1:
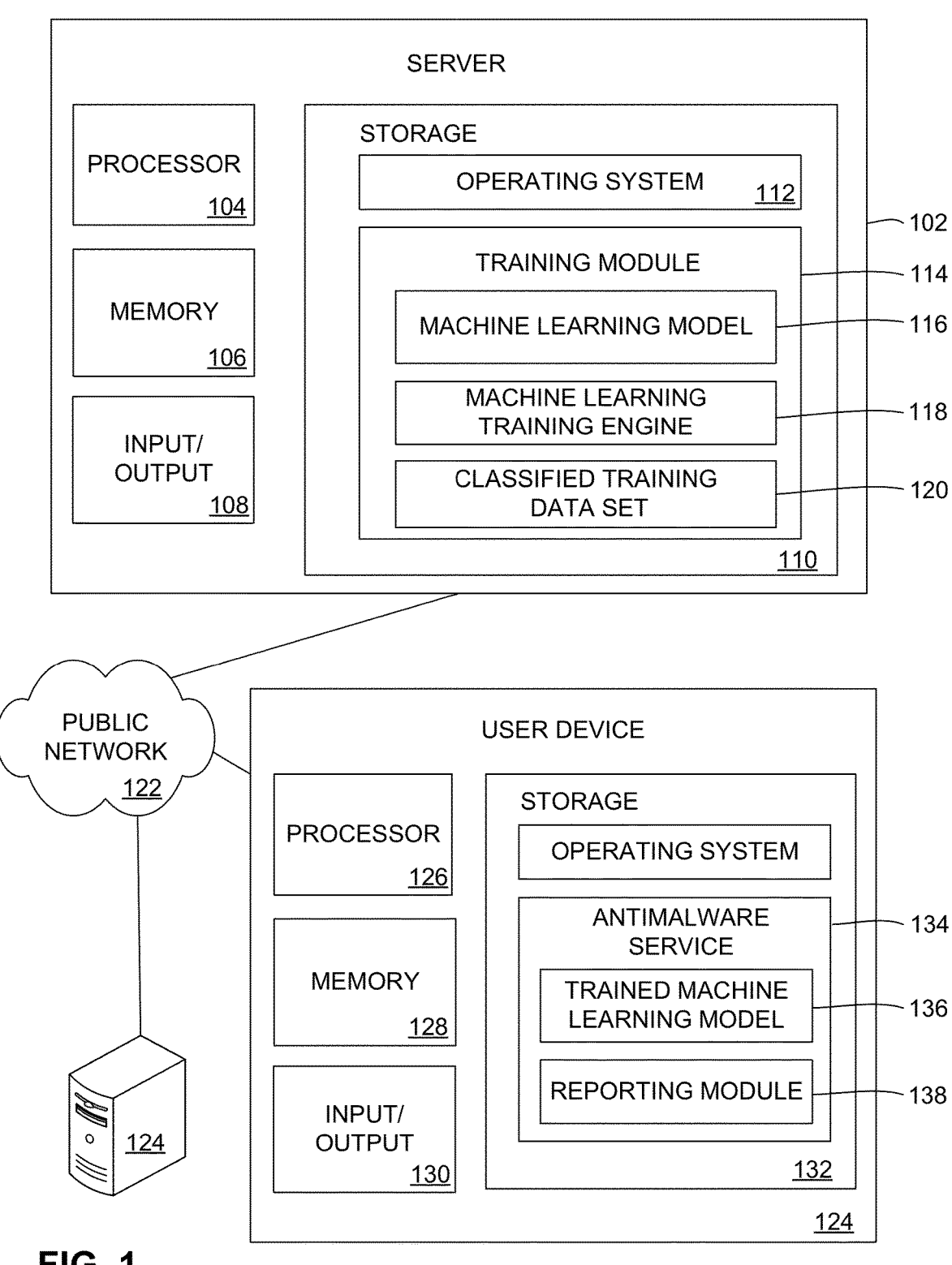
FIG. 1 is a block diagram of a computing environment including a client and server operable to train a machine learning model to recognize phishing content, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing passwords and other information from a computer or using the computer for unintended purposes. These safeguards prevent infection from malware such as ransomware, and protect the user's personal information such as identity, credit card numbers, and computer use habits and interests from being captured by others.

Phishing attacks are a particular type of malicious attack in which an attacker pretends to be a reputable or legitimate company for the purpose of tricking a user into providing information to the attacker. In one such example, an email may ask a user to re-enter credit card information to complete an order, change their password, or perform another activity using an illicit website pretending to be the legitimate company website, such that the attacker captures the user's information if the user follows the link and enters the requested information. In another example, a text message such as an SMS message from an attacker may indicate a package being delivered is being held pending verification of the recipient's information and provide an illegitimate link to enter personal user information which the attacker then uses for malicious purposes. Still other phishing attacks request personal information through other means such as voice messages or hijacking legitimate web pages, or attempt to perform actions other than directly capturing user information such as installing ransomware.

Antimalware software can block phishing attacks in several ways, such as by restricting user access to websites or domains that are known to be malicious and by recognizing and blocking phishing content in email or other sources. But attackers are motivated to alter phishing techniques to evade detection methods such as searching for certain text strings in an HTML page, and phishing attacks continue to evolve.

Modern antimalware software that detects phishing may take a rendered page such as an email and perform optical character recognition on any embedded images and process any rendered text and/or images in a content classifier such as a trained neural network. Attackers therefore often try to obfuscate both text and image-based classifiers, such as by altering or perturbing elements of the phishing email or web page to make them more difficult for a content classifier to recognize as a phishing attempt.

Some machine learning antimalware systems are trained to detect phishing by using adversarial training, in which the training assumes that attacks are normally constrained to subtle changes that successfully evade content classifiers while appearing the same to a user. More specifically, traditional adversarial training methods train on a combination of traditional malicious and benign samples, along with adversarial samples that are typically produced mathematically in a constrained manner to attempt to fool the classifier (or that do fool a traditionally trained classifier) but that are tagged with the samples' true classification. Real phishing attacks tend not to follow such models, but often are created using simple tricks such as presenting an image of text rather than text, stretching or otherwise modifying an image, or misspelling certain words associated with malicious intent. These changes may modify a page quite substantially while still appearing legitimate to a user or may be subtly blended with the content of a legitimate site in a way that is difficult to recognize with traditional antimalware methods.

Some examples presented herein therefore provide for improved training of machine learning models such as neural networks to detect phishing content by generating training samples based on techniques used in actual observed phishing samples that evade classification as malicious in a trained machine learning classifier. In a more detailed example, real-world phishing examples that evade detection by the machine learning content classifier are tagged with one or more techniques used in the examples that are used to evade detection, such that the most common successful evasion techniques can be determined. One or more adversarial training samples are then generated using at least one of the most common successful evasion techniques, and the machine learning content classifier is further trained to detect phishing content using the generated adversarial training samples. In a further example, the adversarial training samples are generated by incremental application of one or more of the most common of the techniques used to evade malicious classification until the phishing content classifier incorrectly classifies the adversarial training sample as benign, but the training sample is near the machine learning phishing content classifier's decision boundary.

The phishing content in some examples comprises a rendered page such as an email, a web page, a text message, or other content that may be presented to a user. Techniques used to evade the machine learning phishing content classifier include in various examples alteration of graphics such as blurring, stretching, cropping, or masking a graphic or altering a company logo. In other examples, techniques used to evade malicious classification comprise altering text content in the page, such as misspelling one or more text words or obfuscating one or more text words as graphics.

Determining the most common techniques to evade malicious classification includes in one example compiling a count of the number of occurrences of each of the one or more techniques observed in the phishing pages that evade malicious detection. The most common techniques by count may then be selected, such as by randomly selecting or combining one more random techniques from the most common of the techniques used to evade malicious classification, and generating at least one adversarial training sample such as by changing the page source code or an image within the page using the selected techniques.

In a further example, the phishing content classifier comprises a neural network, such as a feed-forward neural network that is trained by backpropagation of output errors relative to a ground truth output for a training input. In other examples, different types of neural networks may be employed, or other machine learning methods may be used.

FIG. 1 is a block diagram of a computing environment including a client and server operable to train a machine learning model to recognize phishing content, consistent with an example embodiment. Here, the server 102 includes a processor 104 operable to execute computer program instructions and a memory 106 operable to store information such as program instructions and other data while server 102 is operating. The server exchanges electronic data, receives input from a user, and performs other such input/output operations with input/output 108. Storage 110 stores program instructions including an operating system 112 that provides an interface between software or programs available for execution and the hardware of the server, and manages other functions such as access to input/output devices. The storage 110 also stores program instructions and other data for a training module 114, including machine learning model 116, a machine learning training engine 118, and a classified training data set 120. In this example, the computerized device is also coupled via a public network 122 to one or more user devices 124, such as remote client computers or other smart phones, or other such computerized user devices.

In operation, the server's training module 114 initiates training of a machine learning model 116, such as by using machine learning training engine 118 to teach the machine learning module to recognize classified training data in the data set 120. In a more detailed example, the machine learning model 116 is a neural network, such as a graph neural network or other neural network, that is trained through a process such as backpropagation of error in the neural network's ability to accurately predict the classification of an input training data element. The training data set in a more detailed example comprises phishing data samples that are known to be benign and/or malicious phishing samples, such that the trained machine learning module 116 will be able to recognize whether data inputs such as emails, text messages, other communications, and the like comprise phishing attempts.

In the example of FIG. 1, the machine learning module may be trained using malicious classified data from training set 120, which may typically comprise samples of phishing pages and benign content collected from the "real world," or real user examples of content that are known to be phishing attempts (malicious) or benign. The trained machine learning model 116 may be distributed to end user devices 124, firewalls, or other antimalware systems such as antimalware service 124 which employs a trained learning model 136 which is operable to detect phishing attacks in content on the user device. In this example, reporting module 138 further provides for reporting undetected phishing attempts, false positives, or other such relevant data back to server 102.

False positives and undetected phishing attempts may occur at least in part due to the breadth of obfuscation techniques that attackers may employ, due to combination of various such obfuscation techniques, and due to the emergence of new or altered obfuscation techniques. Further, compiling training data representing the breadth of phishing attempts and benign data likely to be encountered in real-world use is also difficult due to factors such as the variety in types of data likely to be encountered, the variety of different user behaviors likely to be encountered, and the sheer number of data samples generated every day in the real world. It is therefore desirable to recognize and classify phishing attempts that fool a trained machine learning model 136 distributed to end user devices 124, so that the machine learning model 116 can be updated to reflect a current knowledge of obfuscation techniques and phishing attacks likely to be found in the real world.

The training module 114 in this example therefore compiles observed real-world phishing examples that evade detection by the trained machine learning model 136, such as by receiving reports of phishing attempts from end user devices via reporting module 138 or through other means. The techniques used to evade detection are analyzed, such as by human expert tagging, by automated identification of various characteristics of the phishing page, or through other such means. This enables determination of the obfuscation techniques most likely to evade detection in the current trained machine learning model, such that these techniques may be emphasized in improving the accuracy of the machine learning model in detecting phishing content.

These most successful obfuscation or evasion techniques may be used alone or in combination to generate adversarial training samples, as individual training samples and/or in combination to generate training samples. Selection of the techniques used in various training samples may be randomly selected, may be selected based on the statistical prevalence of the obfuscation techniques observed in the wild, or may be selected via another suitable method. Some techniques used to evade the machine learning model include alteration of graphics such as blurring, stretching, cropping, or masking a graphic or altering a company logo, as well as altering text content in the page, such as misspelling one or more text words or obfuscating one or more text words as graphics. In a more detailed example, the degree to which an obfuscation technique is applied is gradually increased while monitoring the output of the trained machine learning model such that the obfuscation technique (or techniques) is applied to a degree that the machine learning model still incorrectly classifies the sample as benign but is near the machine learning phishing content classifier's decision boundary.

The newly-generated adversarial training samples may then be used to further train the machine learning model to detect phishing content, enabling the machine learning model to better identify phishing attacks using new or altered obfuscation techniques. The machine learning model with updated training including the adversarial training samples may then be distributed from the server 102 to end user devices 124, providing better protection against various current phishing attacks. Phishing content or pages in some examples includes a rendered page such as an email, a web page, or a text message that may be presented to a user, but in other examples may include other content designed to trick or mislead a user or user's computerized system into revealing personal or private information such as account logins, credit card information, and the like.

The machine learning model in some examples may comprise a neural network, such as a traditional feedforward neural network trained by backpropagation using training samples with known desired outputs often referred to as "ground truths." In other examples, different types of neural networks such as convolutional neural networks, graph neural networks, and long short-term memory machine learning models may be employed, or other machine learning methods may be used.

FIG. 2 is a flow diagram of a method of using observed phishing obfuscation techniques to generate adversarial training samples to improve machine learning model performance in classifying phishing attacks, consistent with an example embodiment. At 202, phishing pages or samples that evade trained machine learning model classification as phishing attacks are collected. The trained machine learning model classifier may be a commercial-grade phishing classifier in some examples, such as a neural network trained to identify phishing content in various content pages provided as input. The phishing samples in various examples may be emails, web pages, text messages, or other forms of content configured to deceive a user into revealing personal or private information to the attacker. Samples in some examples are collected by human involvement, such as by recognizing phishing content that evades antimalware software that might normally block such phishing attempts from reaching a user's inbox or being displayed on a user's web browser.

The collected phishing samples may be evaluated at 204 to determine which classification evasion or obfuscation techniques were most commonly observed in content that successfully evaded classification as phishing, and in further examples various statistics such as which evasion or obfuscation techniques were seen together most often or worked together best to avoid classification as phishing attacks may be compiled. In a more detailed example this step enables identification of real-world adversarial tactics, and quantification of the prevalence of each of the observed tactics. It also enables detection of new adversarial tactics as phishing attackers change tactics in an attempt to adapt to various defenses.

Examples of classification or obfuscation techniques that have been observed in phishing attacks include altering graphics such as company logos by blurring, stretching, cropping, or masking the graphic, or altering the graphic such as by removing part, rearranging graphic elements, and the like. Text content may be similarly changed or obfuscated such as by intentionally misspelling certain words, presenting the text as a graphic, or other such obfuscation techniques. In other examples, the font of a company logo may be changed, the logo may be blurred, important words or images may be cropped to make optical character recognition difficult, or the company name may be excluded or modified. Company logos may be missing or altered, logos may be stretched or substituted for different logos, background patterns or large images may be altered or replace, and text or logo images may be masked by overlaying something on top of the content. Input fields such as "Login" or "Password" may be obfuscated such as by blurring, cropping, distorting, or misspelling such terms. A variety of other adversarial obfuscation or evasion techniques are likely to be employed in the future, and are similarly a subject of interest for using analysis of collected phishing samples to train machine learning models to detect phishing attacks.

Statistical data regarding the prevalence of various obfuscation techniques and other such adversarial tactics may be employed at 206 to select one or more of these common evasion or obfuscation techniques for inclusion in an adversarial training sample. Selection of observed techniques in some examples may be random, may be based on the frequency with which the samples were observed in real-world data collection, may be based on a correlation between different techniques as observed in the real world or the observed ability of techniques to work together to evade phishing classification, and on other such factors.

Once the evasion or obfuscation techniques for a given training sample are selected at 206, the obfuscation techniques are applied to the training sample, which in various examples may comprise a legitimate page such as a website or email, a known phishing attack page that can be properly classified by the machine learning model, or other suitable content. Application of the selected evasion or obfuscation techniques in various examples may comprise altering the code of a page or changing its embedded images, such as by looking for certain elements in a page's source code and altering those elements before rendering. This has the advantage of being able to target certain elements on the page and allowing the modified page to re-render in a realistic manner without covering other elements of the page. Modifying or masking visible text may be somewhat more difficult, but can be monitored using optical character recognition or other such methods of evaluating the page rendered from the modified source code. In other examples, screenshots or images of the rendered page are modified, such as by identifying regions of the rendered page that are of interest and modifying those areas. Elements may be identified by optical character recognition, trained deep learning models, or other such methods such that logos and graphics may be modified or replaced, text may be recognized and replaced, altered, cropped, or distorted, and fonts or text styles may be altered.

Obfuscation techniques such as these are applied gradually as the training sample is evaluated in the machine learning model, such that the obfuscation technique is applied until the machine learning model's output is near a decision boundary between phishing and benign content. In a further example where the training sample starts as a known phishing attack, the obfuscation technique or techniques are applied until the machine learning model incorrectly identifies the training sample as benign, and an iteration of the training sample that the machine learning model incorrectly identifies as benign is selected. In another example where the training sample starts as benign content, the obfuscation technique or techniques are applied until the machine learning model correctly identifies the training sample as phishing content, but a prior iteration on the other side of the decision boundary that the machine learning model identified as benign is selected.

In another example, some of the obfuscation techniques taken alone may have minimal impact on the machine learning model phishing classifier's output, particularly when applied only to a moderate degree or to a limited area on the page. Selection of several obfuscation techniques to apply in parallel may therefore be desired in some examples, and in a further example the obfuscation techniques and/or page sites to which the techniques are applied are tracked for their effectiveness on negatively impacting the phishing classifier's performance. This process may be repeated until accumulated statistical knowledge enables construction of obfuscated samples that very significantly degrade the phishing classifier's performance, while keeping the total number or degree of modifications within desired constraints. Methods such as these may enable more efficient construction of adversarial training samples that represent emerging and effective obfuscation techniques for training phishing classifiers such as machine learning models or neural networks.

Once an iteration of application of the obfuscation technique or techniques to the training sample is selected at 208, the generated adversarial training sample with one or more obfuscation techniques applied is added to a data set of training samples for the machine learning model at 210. In some examples, a machine learning model is trained on only the newly-generated training samples as a means of updating an already-trained machine learning model, while in other examples the generated training samples are mixed in with other training samples for retraining or training a new machine learning model.

At 212, a statistical process, a user, or another suitable method determines whether the newly-generated training samples adequately represent the evasion or obfuscation techniques collected at 202, such as by considering the number of training samples representing the newly-observed techniques and the number of overall training samples used to train the machine learning model. If more generated training samples representing the newly-observed obfuscation techniques are desired, the process returns to 206 and another training sample is generated. If a sufficient number of newly-generated training samples have been generated as determined at 212, the process continues to 214 and the machine learning model is trained with the newly-generated adversarial training samples. In other examples, training using newly-generated samples is performed before a decision is made as to whether a sufficient number of new training samples have been generated, and a decision as to whether to generate additional training samples and re-train the machine learning model is based on the machine learning model's performance in correctly classifying the collected phishing samples that evade classification from step 202.

These examples show how identifying and characterizing obfuscation techniques used in phishing attacks that evade detection using current machine learning models can be used to generate adversarial training samples to improve the performance of the machine learning model phishing classifier. By using statistical information regarding the prevalence and effectiveness of various obfuscation techniques observed in real-world samples, adversarial samples that are effective and realistic examples of phishing content that evades phishing content classifier detection can be generated and used for training or re-training the machine learning model classifier.

Figure 3:
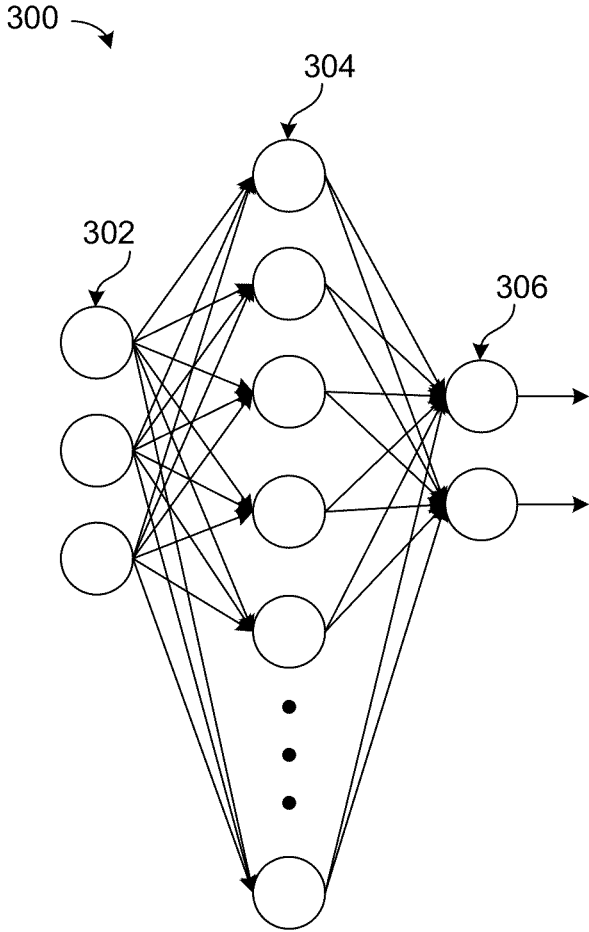
FIG. 3 shows a neural network, as may be employed in some example embodiments.

FIG. 3 shows a neural network, as may be employed in some example embodiments. In some examples, a neural network may comprise a graph comprising nodes to model neurons in a brain. In this context, a "neural network" means an architecture of a processing device defined and/or represented by a graph including nodes to represent neurons that process input signals to generate output signals, and edges connecting the nodes to represent input and/or output signal paths between and/or among neurons represented by the graph. In various implementations, a neural network may comprise a biological neural network made up of real biological neurons, or an artificial neural network made up of artificial neurons, such as for solving artificial intelligence (AI) problems. In some examples, such an artificial neural network may be implemented by one or more computing devices such as computing devices including a central processing unit (CPU), graphics processing unit (GPU), digital signal processing (DSP) unit and/or neural processing unit (NPU). In a further example, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

In one example embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

The neural network pictured generally at 300 in FIG. 3 is formed in "layers" in which an initial layer is formed by nodes 302 and a final layer is formed by nodes 306. All or a portion of features of neural network 300 may be implemented various embodiments of systems described herein. Neural network 300 may include one or more intermediate layers, shown here by intermediate layer of nodes 304. Edges shown between nodes 302 and 304 illustrate signal flow from an initial layer to an intermediate layer. Likewise, edges shown between nodes 304 and 306 illustrate signal flow from an intermediate layer to a final layer. Although FIG. 3 shows each node in a layer connected with each node in a prior or subsequent layer to which the layer is connected, i.e., the nodes are fully connected, other neural networks will not be fully connected but will employ different node connection structures. While neural network 300 shows a single intermediate layer formed by nodes 304, it should be understood that other implementations of a neural network may include multiple intermediate layers formed between an initial layer and a final layer.

In one example, a node 302, 304 and/or 306 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect.

Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular example, an activation output value may be computed and/or generated according to an activation function based on and/or responsive to one or more activation input values received at a node. In a particular implementation, an activation input value and/or activation output value may be structured, dimensioned and/or formatted as "tensors". Therefore, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In various examples, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In one example, a state and/or output signal of such a filter may indicate and/or infer detection of a presence or absence of a feature in an input signal.

In various examples, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

In one example, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

In some examples, output signals of one or more neural networks (e.g., taken individually or in combination) may at least in part, define a "predictor" to generate prediction values associated with some observable and/or measurable phenomenon and/or state. In one example, a neural network may be "trained" to provide a predictor that is capable of generating such prediction values based on input values (e.g., measurements and/or observations) optimized according to a loss function. For example, a training process may employ backpropagation techniques to iteratively update neural network weights to be associated with nodes and/or edges of a neural network based, at least in part on "training sets." Such training sets may include training measurements and/or observations to be supplied as input values that are paired with "ground truth" observations or expected outputs. Based on a comparison of such ground truth observations and associated prediction values generated based on such input values in a training process, weights may be updated according to a loss function using backpropagation. The neural networks employed in various examples can be any known or future neural network architecture, including traditional feed-forward neural networks, convolutional neural networks, or other such networks.

Figure 4:
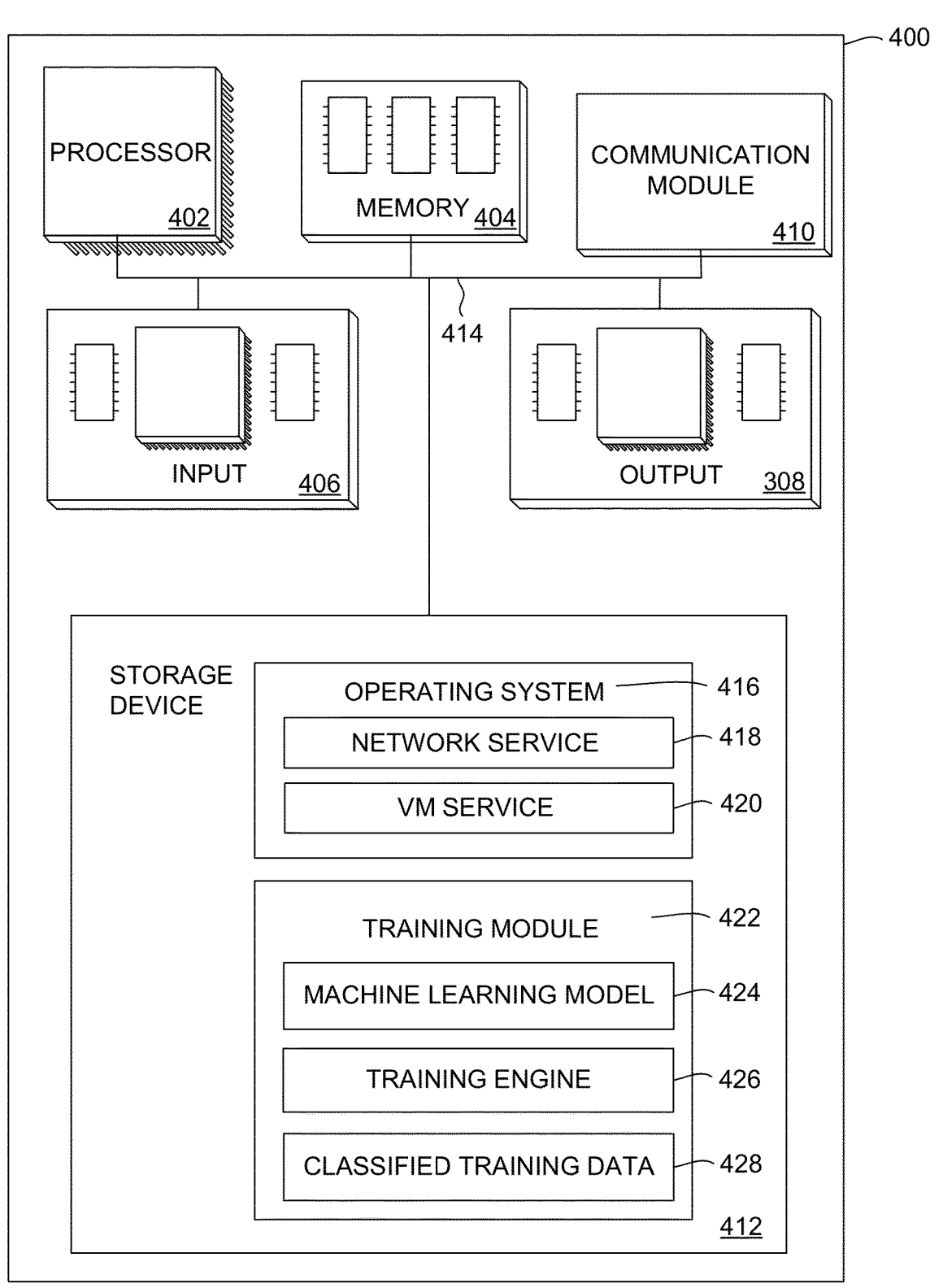
FIG. 4 is a computerized system employing a machine learning model training module, consistent with an example embodiment.

FIG. 4 is a computerized system employing a machine learning model training module, consistent with an example embodiment. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such as training module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as training module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such training module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as training module 422 to components of computing device 400. For example, operating system 416, in one example, facilitates the communication of various applications such as training module 422 with processors 402, communication unit 410, storage device 412, input device 406, and output device 408. Applications such as training module 422 may include program instructions and/or data that are executable by computing device 400. As one example, training module 422 uses machine learning model 424 to classify content as phishing attacks or benign, and is trained via training engine 426 using classified training data 428. The classified training data 428 in a further example comprises one or more adversarial training samples generated to represent one or more obfuscation techniques used in phishing attacks that evade detection using current machine learning models. Such techniques may be identified and statistically characterized in training module for use in generating adversarial training samples in training module 422 to improve the performance of a machine learning model phishing classifier 424. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of training a machine learning model to classify data as malicious or benign, comprising:

identifying at least one phishing page that evades malicious identification by a phishing content classifier;

tagging the at least one phishing page with a technique used to evade malicious classification;

determining one or more most common of the techniques used to evade malicious classification, wherein the one or more most common techniques are determined based on a count of occurrences of each technique observed in phishing pages that evade malicious detection;

preparing a data set comprising the determined one or more most common techniques used to evade malicious classification, wherein the one or more most common techniques are determined based on a count of occurrences of each technique observed in phishing pages that evade malicious detection;

generating at least one adversarial training sample using the determined one or more most common of the techniques used to evade malicious classification, wherein generating the at least one adversarial training sample comprises incrementally applying the one or more most common techniques while monitoring output of the phishing content classifier, and terminating the incremental application at a point where the phishing content classifier incorrectly classifies the adversarial training sample as benign;

augmenting the data set with the at least one generated adversarial training samples; and training the phishing content classifier with the augmented data set.

2. The method of training a machine learning model to classify data as malicious or benign of claim 1, wherein the phishing page comprises an email, a web page, or a text message.

3. The method of training a machine learning model to classify data as malicious or benign of claim 1, wherein the content classifier comprises a neural network trained to identify phishing content.

4. The method of training a machine learning model to classify data as malicious or benign of claim 1, wherein the technique used to evade malicious classification comprises one or more of blurring, stretching, cropping, or masking a graphic or altering a company logo.

5. The method of training a machine learning model to classify data as malicious or benign of claim 1, wherein the technique used to evade malicious classification comprises misspelling one or more text words or obfuscating one or more text words as graphics.

6. The method of training a machine learning model to classify data as malicious or benign of claim 1, wherein determining one or more most common techniques comprise compiling a count of the number of occurrences of each of the one or more techniques observed in the at least one phishing page that evades malicious detection.

7. The method of training a machine learning model to classify data as malicious or benign of claim 1, wherein generating the at least one adversarial training sample comprises selecting one or more random techniques from the one or more most common of the techniques used to evade malicious classification.

8. The method of training a machine learning model to classify data as malicious or benign of claim 1, wherein generating the at least one adversarial training sample comprises incremental application of one or more most common of the techniques used to evade malicious classification until the phishing content classifier incorrectly classifies the adversarial training sample as benign and an incremental further application of the one or more techniques would cause the phishing content classifier to classify the adversarial training sample as malicious.

9. The method of training a machine learning model to classify data as malicious or benign of claim 1, wherein generating the at least one adversarial training sample comprises changing one or more of the page source code or an image within the page.

10. The method of training a machine learning model to classify data as malicious or benign of claim 1, wherein training further comprises adding the at least one generated adversarial training sample to a training data set.

11. A system, comprising:

a computing device comprising a processor and a non-volatile storage, the nonvolatile storage comprising coded instructions that when executed on the computing device cause the computing device to:

identify at least one phishing page that evades malicious identification by a phishing content classifier;

tag the at least one phishing page with a technique used to evade malicious classification;

determine one or more most common of the techniques used to evade malicious classification, wherein the one or more most common techniques are determined based on a count of occurrences of each technique observed in phishing pages that evade malicious detection;

prepare a data set comprising the determined one or more most common techniques used to evade malicious classification, wherein the one or more most common techniques are determined based on a count of occurrences of each technique observed in phishing pages that evade malicious detection;

generate at least one adversarial training sample using the determined one or more most common of the techniques used to evade malicious classification, wherein generating the at least one adversarial training sample comprises incrementally applying the one or more most common techniques while monitoring output of the phishing content classifier, and terminating the incremental application at a point where the phishing content classifier incorrectly classifies the adversarial training sample as benign;

augment the data set with the at least one generated adversarial training samples; and train the phishing content classifier with the augmented data set.

12. The system of claim 11, wherein the content classifier comprises a neural network trained to identify phishing content.

13. The system of claim 11, wherein the technique used to evade malicious classification comprises one or more of blurring, stretching, cropping, or masking a graphic or altering a company logo.

14. The system of claim 11, wherein the technique used to evade malicious classification comprises misspelling one or more text words or obfuscating one or more text words as graphics.

15. The system of claim 11, wherein determining one or more most common techniques comprise compiling a count of the number of occurrences of each of the one or more techniques observed in the at least one phishing page that evades malicious detection.

16. The system of claim 11, wherein generating the at least one adversarial training sample comprises selecting one or more random techniques from the one or more most common of the techniques used to evade malicious classification.

17. The system of claim 11, wherein generating the at least one adversarial training sample comprises incremental application of one or more most common of the techniques used to evade malicious classification until the phishing content classifier incorrectly classifies the adversarial training sample as benign and an incremental further application of the one or more techniques would cause the phishing content classifier to classify the adversarial training sample as malicious.

18. The system of claim 11, wherein generating the at least one adversarial training sample comprises changing one or more of the page source code or an image within the page.

* * * * *